Figure 1:
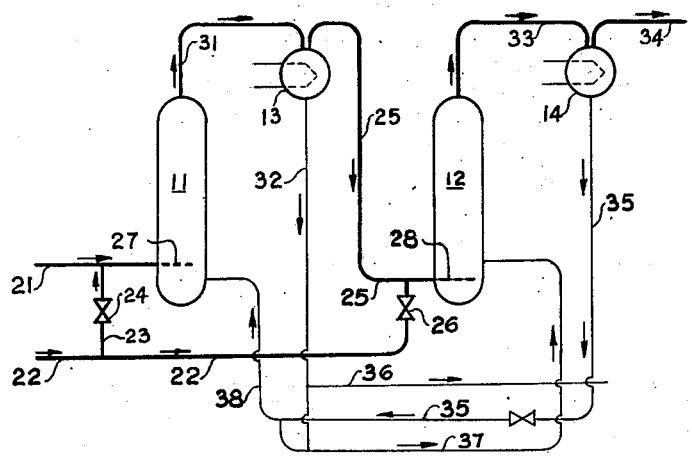

Dec. 31, 1957   H. E. O'CONNELL ET AL   2,818,448
HYDROCHLORINATION OF ETHYLENE
Filed May 13, 1954

United States Patent Office 2,818,448
Patented Dec. 31, 1957

2,818,448

HYDROCHLORINATION OF ETHYLENE

Harry E. O'Connell and James H. Huguet, Baton Rouge, La., assignors to Ethyl Corporation, New York, N. Y., a corporation of Delaware Application May 13, 1954, Serial No. 429,558

5 Claims. (Cl. 260—663)

This invention relates to the manufacture of ethyl chloride. More specifically, the invention relates to the process of making such a compound by the addition of hydrogen chloride to ethylene in the presence of a liquid medium consisting predominantly of ethyl chloride, the ethyl chloride containing a dissolved catalytic amount of a catalyst selected from the group of Friedel-Crafts catalysts.

The manufacture of ethyl chloride by the hydrochlorination of ethylene is a long established industrial process. Various techniques have been proposed for carrying out this chemical reaction. For example, vapor phase reactions have been employed wherein hydrogen chloride and ethylene gases are mixed and passed over a catalyst supported on a porous catalyst support. The process of Webb, U. S. 1,560,625; Wibaut, U. S. 1,591,151; and Suida, U. S. 1,637,972 are typical applications of such techniques. However, a more advantageous technique has been based upon the technique of contacting the hydrogen chloride and ethylene in the presence of a liquid reaction medium consisting essentially of liquid ethyl chloride. The ethyl chloride reaction medium contains a catalytic amount of a dissolved catalyst, particularly a catalyst of the Friedel-Crafts type and usually aluminum chloride. The above described mixed phase method has received considerable commercial success, probably because reactions in the liquid phase are substantially more rapid than gas phase reactions. It is believed that the feed gas components dissolve and react within the liquid reaction medium during the course of contacting and that this reaction is extremely rapid, occurring in a matter of a few seconds.

Despite the extended commercial success of this method, certain ancillary difficulties have been encountered. Most of these arise out of the difficulty of control of the feed reactant ratios and also because of the high activity of the catalysts employed, especially aluminum chloride. The difficulty arising from the feed reactant ratios arises because, generally, the gaseous feeds to the commercial processes are not highly purified streams. These feeds, particularly of the ethylene stream are frequently the by-product materials from other processes. Accordingly, the ethylene stream is frequently a relatively dilute material of the order of 25 to 75 mole percent. It is customary to adjust the feed stream component ratios so that an approximately equal mole proportion of hydrogen chloride and ethylene are introduced. However, and particularly when the ethylene is diluted with other components, a slight variation in the analysis of the ethylene stream can of course result in rapid disturbance of the feed ratio entering the reaction zone. This variation, which cannot be adequately compensated for under normal circumstances, is responsible for several deficiencies. When the ethylene is in excess (with respect to the hydrogen chloride) the excess is lost, in part by reacting in the residue gas from the process. Small amounts of ethylene (that is, small concentrations) present difficult recovery problems so that it is not economical to recover sporadic amounts of unreacted ethylene.

Another variant of this disadvantage arises from the loss by polymer formation. The exact mechanism of polymer formation is not precisely understood, but it is known that when an excess of ethylene is present, that the rate of polymer formation is increased. This polymer is actually a complex of catalyst with a polymeric hydrocarbon-like oil. Some formation continuously occurs, especially when aluminum chloride is used as a catalyst, but when any appreciable excess of ethylene is fed, the rate of formation is increased. This, then, results in an increase in catalyst consumption as well as high consumption of ethyl chloride.

It has been proposed that a substantial excess of hydrogen chloride be used continuously inasmuch as this excess contributes to the efficiency of ethylene utilization and to a low rate of catalyst deactivation. Unfortunately, however, the use of an appreciable hydrogen chloride excess necessitates such expensive auxiliary operations that it has not been economical to operate with an effective excess of this reactant. The unreacted hydrogen chloride must be neutralized and discarded, or a rather difficult aqueous recovery operation must be employed. As is well known, hydrogen chloride is an extremely corrosive material, so that non-metallic equipment is necessary for aqueous recovery operations. The cost of such supplemental recovery operations counteracts the gains of an excess of hydrogen chloride.

The object of the present invention is to generally provide a new and improved hydrochlorination process. A more specific object is to provide an ethylene hydrochlorination process wherein the advantages of a substantial excess of hydrogen chloride are obtained, but at the same time, hydrogen chloride consumption is reduced to a satisfactorily low level. A related object is to reduce the consumption of ethylene. An additional object is to provide for maintaining the effect of a substantial hydrogen chloride excess despite substantial variations in the ethylene concentrations of the ethylene containing feed stream, as are encountered particularly in the case of dilute ethylene feeds. Other objects will appear hereinafter.

In its most general terms, our process involves carrying out the hydrochlorination reaction in two separate stages. All the hydrogen chloride fed to the process is however, fed to the first stage, plus a substantial proportion—over one-half and preferably above three-fourths—of the ethylene is also fed to the first stage. The hydrogen chloride excess in the first stage is discharged as a vapor component and is then introduced to the second stage, along with the balance of the ethylene feed, or "residual" ethylene, to the process. The overall feeds of these two reactants to the operation are in approximately equimolal proportions of hydrogen chloride to ethylene. By equimolal is meant, usually, an overall or cumulative feed ratio of from about 0.98:1.0 to 1.02:1.00, $HCl:C_2H_4$.

The several stages of the process may be carried out in entirely discrete or separated reaction zones. Alternatively, however, a unitary reaction vessel may be employed and the benefits of the process obtained. By unitary is meant that a common reaction shell or vessel is provided, but the dual reaction stages are nevertheless established and maintained. In this type of embodiments of the process, a portion of the ethylene feed is diverted and introduced at a point in the reactor relatively remote from the feed point of the hydrogen chloride and the main portion of the ethylene.

A further feature of the process is that although the overall feed to the process is maintained at approximately equimolal ratios, the effect of this process is the same as if an appreciably greater ratio is provided throughout each reaction stage.

Figure 2:
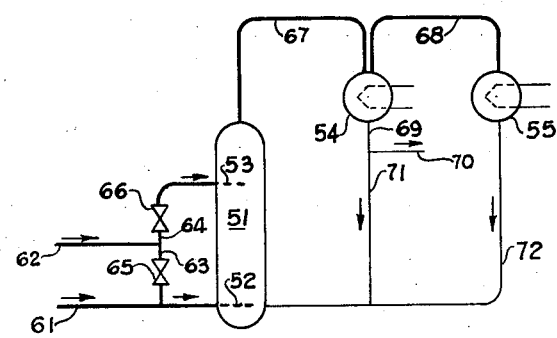

The best mode of operation of the process and its preferred embodiments are described hereinafter with reference to the figures. Figure 1 is a schematic diagram showing an embodiment of the process wherein the several stages of the hydrochlorination are in discrete or separated reaction chambers. Figure 2 is a schematic flow sheet showing a preferred and simplified embodiment of the process, wherein the objects of the invention are attained without the necessity of a multiplicity of reaction vessels.

Considering firstly the apparatus schematically shown in Figure 1, a first reactor 11 and a second reactor 12 are shown. These reactors are cylindrical steel vessels mounted in a suitable structure. The reactors may be packed with Raschig rings, Berl saddles, or other suitable packing material. Overhead condenser systems of conventional design 13, 14 are provided for liquefying condensable components from the vapor overhead from the reactors 11, 12. Gaseous hydrogen chloride feed is made available to the installation through the line 21. Ethylene feed is supplied through line 22. A branch ethylene line 23 provides for diverting a portion of the ethylene feed from the main feed line 22 to the hydrogen chloride feed line 21, the proportion being controlled by a valve 24. The hydrogen chloride and a portion of the ethylene feed are thus introduced into reactor 11 through line 21, a distribution device 27 is provided within the reactor 11, for more or less uniform distribution of the mixed feed gases across the transverse area of the reactor. This distributor may be in several forms, for example, a "crow's-foot" arrangement of branch lines may be used, or mono-planar coil of pipe may be provided with orifices or apertures uniformly distributed along its length. The non-diverted ethylene continues through line 22 and is passed to a vapor line 25, this flow being controlled by a valve 26. The mixture of vapor from the first reactor 11 (after partial condensation of some components), with the "residual" ethylene is introduced therethrough into the second reactor 12, a distributor 28 again being provided for transverse distribution. Overhead gases from the first reactor are discharged through a vapor line 31 which passes to the first overhead condenser 13 for liquefaction of a portion of the condensable components, principally ethyl chloride. The liquid so condensed is passed through a liquid line 32. A product line 36 branches from the liquid condensate line 32 and provides for delivery of a product stream to a final clean up or purification operation. A line 25 transfers non-condensed vapors from the first condenser 13 to the second reactor 12. An overhead vapor line 33 from the second reactor 12 is provided to transfer these vapors to a second condensing system 14. A residual gas line 34 receives non-condensed gaseous components from the second condenser and transfers to a burning stack or to other operations for fuel purposes. A liquid condensate line 35 connects to the second condenser system 14 for recovery and transfer of the condensate formed therein. The condensate line 35 connects to the condensate line 32 from the first condenser system. The combined condensates may then be transferred through line 35 to the first reactor 11 or to the second reactor through a second recycle line 37.

Turning to Figure 2, this figure is a schematic representation of a plant employing a preferred embodiment of the process. In this installation a single reactor shell 51 is employed. Provision is made for introduction of gaseous feeds at two distribution devices 52, 53, these being located at the bottom and above the vertical midpoint of the reactor 51. Hydrogen chloride and ethylene feed lines 61, 62 provide for feed or these reactants to the system. The ethylene feed line 62 branches into two lines 63, 64. The lower ethylene branch line 63, containing a control valve 65, joins the hydrogen chloride line 61, and thus allows introduction of a mixed feed to the lower distributor 52. The upper ethylene branch line 64 is connected to the upper distributor 53, flow of the ethylene containing gas being controlled by control valve 66. An overhead vapor line 67 discharges reactor overhead vapors and transfers them to a condenser system 54. Non-condensed vapors are transmitted through a residue gas line 68. Liquefied condensate is discharged through a line 69 which branches into a product line 70 and a recirculation line 71 which is connected to the reactor.

The advantages of typical operation of the process will be readily understood from the following examples.

Example 1

This example illustrates a typical operation using the apparatus schematically illustrated by Figure 1, that is, two distinct and segregated reactors. A hydrogen chloride supply consisting of substantially pure and anhydrous hydrogen chloride gas is provided through line 21. An ethylene supply stream is supplied through line 22, this supply stream being a typical commercial feed stock having the following normal composition:

| | Volume percent |
|---|---|
| Ethylene | 97 |
| Methane | 0.5 |
| Ethane | 2 |
| Carbon dioxide and misc. | 0.5 |

The gross feeds to the plant are apportioned in the range of about 127 to 133 pounds of hydrogen chloride to 100 pounds of ethylene, this corresponding to an overall mole ratio of from 0.98 to 1.02:1.00 HCl:ethylene.

The hydrogen chloride feed stream is entirely through line 21 to the first reactor 11. On the other hand, the ethylene feed stream is split by drawing off a portion of about 90 percent through the diverter line 23 to join with the hydrogen chloride in line 21. The mixed feed gases to the first reactor 11 thus are adjusted to a composition having an appreciable excess of hydrogen chloride. Thus, in the present instance, when the overall feed ratio to the operation is exactly 1.0:1.0, HCl:$C_2H_4$, the molal feed ratio to the first reactor 11 is 1.11:1.0, when a precise 90 percent portion of the ethylene is fed to the first reactor. The control of an ethylene split in a range of a percent is, however a difficult objective, and as a practical guide, we prefer to control the operation on the basis of the reactant ratio to the first reactor. This ratio is uniformly to provide an appreciable hydrogen chloride excess; the normal range being from 1.05:1.0 to 1.15:1.0, HCl:$C_2H_4$. In the present instance, the vapor feed to the first reaction is:

| | Volume percent |
|---|---|
| Hydrogen chloride | 51 |
| Ethylene | 47 |
| Other components | 2 |

The contents of the reactor 11 are maintained at a temperature of 115–125° F. The reactor contains a previously formed reactor solution consisting substantially of ethyl chloride containing roughly one weight percent dissolved aluminum chloride. The pressure on the system is about 40 pounds per square inch gauge. In passing up through the reactor solution, the ethylene and hydrogen chloride combine to form additional ethyl chloride and at the temperature of operation and with the amount of inert diluents present, the ethyl chloride so formed is vaporized and removed in the overhead stream discharged through line 31. The overhead vapor stream when operating as above described contains about 90 volume percent ethyl chloride, 8 percent hydrogen chloride, and about 2 percent minor impurities. This stream is passed to the condenser system 13, where the stream is cooled sufficiently to condense a large portion, of the order of 90 percent, of the ethyl chloride compound. The liquid condensate consists, in addition to the ethyl chloride, of about 2 weight percent hydrogen chloride dissolved therein.

Non-condensed vapors discharged from the condenser system 13 through line 25 will contain the unreacted hydrogen chloride and the non-reactive inerts in the gaseous components, principally methane and ethane. This is joined with the residue of the ethylene which is fed through line 22 and comprises the feed to the second reactor 12. The overall composition of the mixed feed to the vessel reactor depends in part on the temperature at which the first condenser system operates. In the present instance, operating with a discharge temperature of about 90° F., the feed to the second reactor 12 has an average composition as follows:

| | Volume percent |
|---|---|
| Hydrogen chloride | 20 |
| Ethylene | 17 |
| Ethyl chloride | 51 |
| Other | 12 |

The second reactor 12 is operated at conditions approximating the first reactor conditions, viz. 115–125° F. and about 40 pounds gauge pressure. Overhead gases from the second reactor pass through the second condensing system 14, and are cooled to a very low temperature, of the order of −80° F. This condenses all but a minute quantity of the ethyl chloride present, the non-condensed residue gas being a relatively small stream, consisting essentially of about 65 volume percent inert diluents, 16 percent hydrogen chloride, and 19 percent ethylene.

As heretofore indicated, the condensate from the first condenser system is the source of the product stream. It has been found that, by only a partial condensation of the ethyl chloride component in the reactor overhead vapor, the presence of substantial amounts of hydrogen chloride impurity in the product stream can be avoided. Thus, it is particularly advantageous, in the first condenser system, to discharge a condensate at a temperature of about 90 to 100° F. The ethyl chloride so condensed is thus 98 percent or greater purity.

The relative proportions of product liquid drawoff, to the total amount of liquid condensate from the first condenser system, is set primarily by the necessity of maintaining a constant liquid level in the two reactors 11, 12. The proportion will also of course be incidentally affected by the operating temperature and pressures employed, and by the amount of diluent gaseous components in the system. In the present operation, about 25 to 28 percent of the condensate in the condensate line 32 is discharged through the product line 36 as a 98 percent or better ethyl chloride stream. This ethyl chloride corresponds to a yield of over 95 percent on the ethylene fed and 93 percent or better on the hydrogen chloride fed.

*Example II*

A preferred and simplified embodiment of the process, and in fact one which is readily adaptable to previous installations is described in this example. The characteristic of the present embodiment is the introduction of the ethylene feed in several different points in the same reaction vessel.

Referring to Figure 2, an ethylene containing stream is provided through line 62, and a hydrogen chloride supply through line 61. Approximately 90 percent of the ethylene is diverted through the branch line 63 and combined with the hydrogen chloride. The mixture, having a hydrogen chloride:ethylene ratio of 1.11:1.0, is introduced to the reactor through the distributor 52. The remaining 10 percent of the ethylene is fed through line 64 and the upper distributor 53, which is located at a level corresponding to approximately 60 percent of the depth of the reactor solution.

As in the preceding example, the reactor solution is maintained at a temperature of about 120° F. and a pressure of about 40 pounds per square inch. The overhead gases are cooled in the first unit 54 of the condensing system to about 90° F., and in the final portion of the condensing system to the low temperature of −80° F. Approximately one-fourth of the condensate from the first condenser 54 is discharged through line 70 and passed to subsequent fractionation or stabilizing towers for removal of the small amount of dissolved impurities. The residue is returned through the recycle line 71 to the reactor 51 to maintain the liquid level therein.

By contrast with the efficiency of operation according to the present process, when an equivalent reaction section is used with the conventional mode of operation, the hydrogen chloride must be fed in at least a 10 percent excess in order to obtain equivalent conversions of ethylene. Accordingly, the present invention reduces by at least 10 percent the consumption of hydrogen chloride.

It will be apparent that the principles of the operation are applicable through a very wide range of conditions. Among the factors which will result in and allow variation in the conditions are the composition of the feed streams, particularly the ethylene, that is with respect to the inert components present. Stated conversely, the temperature and pressure of operation will be affected by the amount of diluents accompanying the ethylene to the reactor.

Generally, the benefits of the invention are most significant in processes carried out at elevated temperatures and pressures, that is, above 100° F. and at pressures of over 25 pounds per square inch. The mode of cooling the reaction space can also be varied without altering the benefits of the process. In the preceding examples, the heat of reaction was removed from the system by the overhead vapor condensing system. Alternatively, forced circulation liquid cooling exchangers can be utilized to directly cool the catalyst solution within the reaction zones.

As in the conventional processes of hydrochlorinating ethylene, the aluminum chloride catalyst is continuously deactivated. The deactivation product is a polymeric material which can be removed from the system by continuously withdrawing a portion of the reactor solution and vaporizing the ethyl chloride therefrom. The catalyst so deactivated must be replaced by either intermittent or continuous replenishment.

The embodiments of Figure 2, and Example II, while offering certain very desirable economies over the installation illustrated by Figure 1 introduces a further requirement in order to obtain the full benefits of the process. Thus, unless the appropriate provisions are made, there is a tendency for the liquid reaction medium present to be uniformly mixed throughout the reaction zone owing to the high degree of agitation provided by the upflowing gases. This condition tends to negate the benefits of the process. In order to avoid this factor, it is found that a length:diameter ratio of at least 10:1 should be maintained, this ratio referring to the liquid depth in the reactor as compared with the diameter thereof.

The volumetric proportions of the several stages of the process can be varied through an appreciable range. In cases wherein two separate reactors are used, it is preferred that equal volumes be used. In embodiments wherein a single reaction vessel is employed, the point of introduction of the "residual" ethylene should be at least above the mid point of the reaction solution height. It is, of course, obvious that this point of feed should not be so near to the top of the reactor solution that the contact therewith will be ineffective. It is found that a practical guide, with respect to this factor, is to provide a fraction of reactor solution depth, above the point of "residual" ethylene feed, equal to at least two times the fractional amount of "residual" ethylene. Thus, if 5 percent of the total ethylene is fed at this point, the point of feed should be below a point corresponding to 10 percent of the total depth. Similarly, if the residual ethylene is, for example, 15 percent of the total ethylene, then this residual ethylene is fed at a depth of at least 30 percent.

As already stated, in virtually all forms of the process, at least one-half of the ethylene to the process is fed to the first stage, and it is preferred that at least three-fourths be fed to this stage. The benefits of the process are obtained in the highest degree when the distribution is at or above the latter level, with no appreciable change up to about nine-tenths. When more than nineteen-twentieths of the ethylene is fed to the first stage, the benefits of the process are rapidly reduced, and for practical purposes not more than nineteen-twentieths of the ethylene should be fed to the first stage.

Although it is generally preferred, in embodiments of the process utilizing two discrete reaction vessels, that identical vessels be employed, for economy in inventment, the process is not thus limited. Thus, a suitable variation involves an initial reaction zone comprising a plurality of parallel tubular reaction spaces, each surrounded by a heat transmission boundary. This variant provides, in effect, an integral liquid-liquid heat exchanger operation simultaneously with the reaction, so that a particularly uniform temperature level is maintained throughout the first reaction stage. As in all forms of the process, this embodiment of course provides for intimate contacting of the gaseous reactants with the liquid catalyst solution.

Further with respect to embodiments using separated reaction vessels, in such embodiments it is preferred that the product stream be obtained by a partial condensation of a relatively pure ethyl chloride liquid from the vapor discharge from the first reaction zone. In order to obtain such a product liquid stream, it is found that a partial condensation be required of at least three-fourths and not over about nine-tenths of the ethyl chloride from the vapor discharge.

In those embodiments of the process using a single reaction space wherein the several stages are defined by the points of introduction of the residual ethylene stream, the demarcation of the reaction stages may be even more effectively obtained by suitable baffle arrangements within the reaction spaces. Thus a perforated plate or a bubble cap plate can be advantageously used for this purpose.

It will be understood that wide variation in the variables of the process can be entertained without departing from the scope of the invention as defined in the following claims:

We claim:

1. The improved process of hydrochlorinating ethylene comprising providing hydrogen chloride and ethylene feed streams in proportions of from 0.98 to 1.02 moles of hydrogen chloride to one mole of ethylene, feeding the hydrogen chloride and from about one-half to about nineteen-twentieths of the ethylene to the bottom of a first reaction zone at the same point in said reaction zone and contacting therein with a reaction medium consisting essentially of ethyl chloride having a Friedel-Crafts catalyst dissolved therein, and hydrochlorinating therein the ethylene so fed, withdrawing a vapor stream comprising the hydrogen chloride unreacted in the said first reaction zone, feeding the hydrogen chloride and the rest of the ethylene at the same point to a second reaction zone containing a reaction medium therein said reaction medium consisting essentially of ethyl chloride having a Friedel-Crafts catalyst dissolved therein and contacting therewith until the ethylene is substantially all reacted with the hydrogen chloride; and withdrawing from the said first and second zones the ethyl chloride formed therein.

2. The process of claim 1 further defined in that from about three-fourths to about nine-tenths of the ethylene feed stream is fed to the first reaction zone.

3. The process of claim 1 further defined in that the first and second reaction zones are of equal volume.

4. The improved method of manufacturing ethyl chloride comprising providing hydrogen chloride and ethylene feed streams in proportions of from 0.98 to 1.02 moles of hydrogen chloride to one mole of ethylene, the ethylene feed stream including inert diluents, mixing the hydrogen chloride and sufficient of the ethylene stream to provide a mixture having a hydrogen chloride:ethylene ratio of from about 1.05:1.0 to 1.15:1.0 and passing the said mixture upwardly through a catalyst solution comprising ethyl chloride having a catalytic quantity of aluminum chloride dissolved therein, thereby converting substantially all the ethylene to ethyl chloride, discharging a vapor overhead stream comprising the unreacted hydrogen chloride and ethyl chloride, and inert diluents, condensing at least three-fourths of the ethyl chloride in said vapor stream, then mixing the rest of the ethylene with the uncondensed vapor and passing said mixture to a second reaction zone containing a catalyst solution comprising ethyl chloride having a catalytic quantity of aluminum chloride dissolved therein, said catalyst solution being approximately equal in volume to the catalyst solution in the first reaction zone, passing the mixture upwardly through said catalyst solution thereby converting substantially all the ethylene to ethyl chloride, and forming and discharging a vapor overhead stream comprising ethyl chloride and minor quantities of unreacted hydrogen chloride, ethylene and diluents, condensing substantially all the ethyl chloride from said overhead stream to form a second condensate stream, the first condensate stream being divided into approximately one-fourth which is discharged as a product stream and approximately three-fourths which is mixed with the second condensate stream and recycled to the first and second reaction zones.

5. The improved method of hydrochlorinating ethylene comprising providing hydrogen chloride and ethylene streams in the proportions of from 0.98 to 1.02 moles of hydrogen chloride to one mole of ethylene, mixing the hydrogen chloride and a first fraction of the ethylene to provide a mixture having a hydrogen chloride:ethylene mole ratio of from about 1.05:1.0 to 1.15:1.0 and feeding said mixture to the bottom of a vertical reaction zone of substantially uniform cross section and contacting with a reaction medium therein, said reaction medium consisting essentially of ethyl chloride having a catalytic quantity of aluminum chloride dissolved therein, and concurrently feeding the rest or second fraction of the ethylene to the upper portion of the reaction zone, at a vertical point at least above the midpoint of the reaction medium depth and providing a fraction of the reaction medium depth above said point equal to at least two times the said second fraction of ethylene, thereby converting substantially all the ethylene of said second fraction to ethyl chloride, and withdrawing the ethyl chloride formed in the reaction zone.

References Cited in the file of this patent

UNITED STATES PATENTS

| 2,097,750 | Arnold et al. | Nov. 2, 1937 |
| 2,434,094 | Axe | Jan. 6, 1948 |

FOREIGN PATENTS

| 780,057 | France | Jan. 24, 1935 |

OTHER REFERENCES

Tulleners et al.: "Rec. Trav. Chim.," (1934), vol. 53, pages 545–549.